Reissued Dec. 14, 1937

Re. 20,594

UNITED STATES PATENT OFFICE 20,594

METHOD OF TREATING INVERT SYRUP, HONEY, AND THE LIKE

Robert S. Anthony, New York, N. Y.

No Drawing. Original No. 2,094,053, dated September 28, 1937, Serial No. 53,930, December 11, 1935. Application for reissue October 12, 1937, Serial No. 168,578

3 Claims. (Cl. 127—42)

The invention herein disclosed is directed to a process for recovery or separating levulose from materials or substances containing it, such as invert sugar syrups, honey, fruit juices, and maple syrup.

The chief object of the invention is to provide an improved, efficient and commercial method of separating levulose from such materials in a manner to obtain a maximum yield.

Another object of this invention is to produce uncrystallizable honeys, fruit juice concentrates, and maple concentrates.

Many other objects and advantages of this invention will become apparent from a consideration of the following detailed description of the invention.

This application is a continuation in part of my copending application Serial No. 747,710, filed October 10, 1934, for Method of producing levulose.

This invention resides substantially in the steps and series of steps as will be described in full detail below.

Such processes as are now known for the purpose of separating levulose from materials and substances containing it are either inefficient or highly expensive to practice.

The extraction of levulose from invert syrups, honey and the like is rendered difficult by reason of the composition of such materials. For example, in general honey consists in a mixture of dextrose and levulose in approximately equal proportions. The dextrose, especially in honey that has stood for some time, is partially present in crystal form, while the remainder is in solution with all of the levulose. Therefore, any process which is to efficiently separate the levulose from materials of this type must not only separate the crystallized dextrose from the mixture, but must likewise be equally efficient in separating the dextrose in solution from the levulose in solution.

Because of the inefficiency or expensiveness of known processes levulose is an expensive product which does not find extensive use, notwithstanding its many valuable characteristics and properties. Levulose is of great utility because of its greater solubility than sucrose (cane sugar) and dextrose (corn sugar). Sucrose has a solubility of about two parts to one part of water; dextrose has a solubility of about one part to one part of water, while levulose has a solubility of approximately six parts to one part of water.

Another desirable characteristic of levulose is that it is extremely difficult to crystallize it. Its sweetening power is almost twice as great as cane sugar, and almost three times greater than corn sugar. It has greater preserving powers against micro-organisms than sucrose, and dextrose, and it does not ferment easily. It may be eaten by diabetics to an extent of approximately two ounces per day (six teaspoons). Products containing it do not dry out easily, and it is because of its great hygroscopicity that it is desirable for incorporation in such products as tobacco, cakes, breads, candies, and the like.

A levulose containing syrup which is also known as invert syrup is today used in great quantities for various purposes. It contains in addition to levulose the undesirable sugar dextrose, which ingredients occur in equal quantities in a ratio of one to one. Notwithstanding the presence of the large amount of dextrose, invert syrup is quite effective in many uses, but obviously in view of its above characteristics it would have greatly increased usefulness if the dextrose were removed therefrom. The prime object of this invention is to effect a mechanical separation between the two.

Commercial levulose is at present manufactured by hydrolysis of inulin from artichokes, chicory, and the like. Levulose produced by this method costs approximately $2.00 per pound. Levulose may likewise be separated by other chemical methods, but they are all inefficient, giving low yields and are troublesome and costly.

By contrast the advantages of levulose over dextrose will be apparent. Whereas levulose is employed to keep a product from drying out, dextrose is often used to keep a product dry, or to dry it out. Levulose is used to increase the sweetness of a product, while dextrose is employed for the opposite effect. Levulose prevents crystallization or "graining", whereas dextrose is often used to effect crystallization.

An important characteristic of the method of this invention which distinguishes it from the prior chemical methods is that it is wholly a mechanical process.

Another object of the invention is to provide a process yielding a maple syrup of high levulose content.

A further object of the invention is to provide a new product originating from pure maple syrup having the characteristics of high levulose content, high sweetening power, high flavoring power, non-crystallizable, and better keeping powers. The by-product of this method is maple sugar in crystallized form.

A still further object of the invention is to provide a process yielding a non-crystallizing honey of high levulose content, increased sweetening power, and improved flavoring value.

An important characteristic of this invention is that it is carried out without the use of high temperatures and without the use of reacting chemicals.

A further object of the invention is to provide a process for producing non-solidifying or crystallizing concentrated fruit juices such as orange juice, pineapple juice, grape juice, apple juice, and the like having improved characteristics.

The several processes in accordance with this invention will now be described.

To crystallized invert syrup having a total solids content of 73 to 76% containing a minimum of uninverted sucrose is added alcohol to the point where the ratio of alcohol to alcohol and water is 0.85 to 0.87, and the ratio of total solids to total solvent is 0.40 to 0.42. This mixture is thoroughly mixed at a temperature of the order of 70 to 80 degrees F. and then stored until equilibrium is established. Those skilled in the art will understand how to determine when equilibrium has been established, as for example by analysis of the liquid phase.

Under this example the liquid phase may have at the start a levulose content of 51%, but upon standing the levulose content increases in this phase, due to crystallization of the dextrose, until with a syrup of the above proportions it will reach a concentration of 88% to 91% levulose. This then represents the equilibrium for the above proportions, or in other words the point beyond which the concentration of levulose does not increase. Crystallization may be hastened by continuous stirring, but this is ordinarily not necessary. It is important that the temperature of the mixture be maintained uniform since either cooling or heating will have a tendency to diminish the yield of levulose.

The liquid phase after equilibrium is established is withdrawn in any suitable manner, as by means of a pump. The solid material remaining behind is stirred up to a mobile slush, and run into a solid basket centrifugal separator where the remainder of the liquid phase is removed. The liquid phase thus recovered both by pumping and centrifuging is then distilled to recover its alcohol content. The by-product dextrose collected in the centrifuge may be dried in a vacuum, preferably with continuous stirring, to preserve its crystalline form, and the alcohol is recovered.

From the above it will be seen that the concentration of levulose in the final product is 88% to 91%, the remainder being dextrose. Of the total levulose content of the invert syrup approximately 96% has been recovered.

Honey may be treated in accordance with this invention to provide a honey which does not crystallize on standing. Although honey may be treated in accordance with this invention to extract the levulose therefrom, it is to be noted that the method of the invention is available for the above mentioned purpose of producing a non-crystallizable honey. In practising the method to remove the levulose content from honey, the procedure given above in connection with invert syrup can be followed. In the event that it is desired to produce non-crystallizable honey the above procedure is only changed with respect to the nature and quantity of the solvent. In this case the solvent is preferably one composed of substantially 85% ethyl alcohol, and 10% methyl alcohol, the remaining 5% representing the usual amount of water present in commercial alcohol. When employing this solvent and following in detail the method given above in the treatment of invert syrup, the methyl alcohol was found to increase the solvent power of the ethyl alcohol so that the dextrose content of the final honey product is within a range whereby the honey will not crystallize upon standing. The methyl alcohol allows a considerable reduction of the ratio of total solvent to total solids, thus effecting an economy of solvent. As those skilled in the art will appreciate, the same object may be secured by using a sufficiently small quantity of ethyl alcohol, or by varying the proportions of ethyl and methyl alcohol used. For example, if a honey of 73 to 74 degrees Brix is mixed with ethyl alcohol such that the ratio of alcohol to alcohol and water is approximately 0.65 and the ratio of total solids to total solvent is approximately 0.95 and the mixture thoroughly stirred in accordance with the detailed procedure given above in connection with invert syrup, there will be present in the final product approximately 67% levulose and 32% dextrose, assuming that the original honey contained 50% levulose and 50% dextrose. The resulting product will be a non-crystallizable honey.

In accordance with the principles of this invention a true maple syrup concentrate may be produced from maple sap syrup. Such a concentrate will have a high levulose content and will be non-crystallizing. Ordinary syrup is rapidly heated to evaporate some of the water therefrom until the solid content represents 89 to 91 degrees Brix. The concentrated maple syrup is made to crystallize by seeding and stirring until its temperature drops to approximately 185 degrees F. A mixture of 85% ethyl alcohol, 10% methyl alcohol, and the usual water content of 5% is added to the concentrated maple syrup in an amount so that the ratio of alcohol to alcohol and water is approximately 0.75 and the ratio of the total solids to total solvent is approximately 1.43. This admixture is accompanied by a thorough stirring until the temperature of the mixture falls to 80 degrees F. The mixture is then allowed to stand until equilibrium is established. That is until the quantity of solids in the liquid phase becomes constant. This may be conveniently determined by means of a refractometer. The liquid phase is then decanted in any suitable manner, and the remaining magma centrifuged to remove the remaining liquid phase. The alcohol is then removed, preferably by evaporation in a vacuum from both the magma and the liquid phase to recover it for re-use. The concentrate of the liquid phase represents the maple concentrate product while the solids remaining in the centrifuge represent a useful product in the form of maple sugar. The maple flavor concentrate has approximately nine times the concentration of the original maple syrup and a levulose content of about 75%.

A higher maple flavor concentrate may be produced either from commercial maple bag sugar or by concentrating maple syrup to a greater extent than given in the example, and using a higher alcohol to alcohol and water ratio. For example, the maple syrup may be concentrated until it becomes either a solid crystalline mass or a plastic crystalline mass.

It is to be noted that some of the syrups here employed contain sucrose which may by hydrolysis be inverted to levulose and dextrose, thereby adapting them for treatment by this process.

It may here be noted that the levulose product of this invention is not one hundred percent pure. It is possible, in accordance with the method herein disclosed, to produce a levulose solution containing as high as 91% levulose. It is intended that the claims cover this product, even though it contains some additional but not harmful elements such as dextrose.

From the above description it will be apparent that this invention is not necessarily limited to the scope of the illustrations given for the purpose of clearly defining the invention. I do not, therefore, desire to be strictly limited to the disclosure as given for purposes of illustration, but rather to the scope of the appended claims.

What I seek to secure by United States Letters Patent is:

1. The method of extracting levulose from substances containing invert sugar such as crystallized invert syrup and crystallized honey, comprising adding ethyl alcohol with the substance to the point where the ratio of alcohol to alcohol and water is of the order of 85% and the ratio of total solids to alcohol and water is of the order of 40%, thoroughly mixing them at a temperature of the order of 75 degrees F., causing the mixture to attain equilibrium, and separating the liquid phase therefrom.

2. The method of extracting levulose from substances containing invert sugar such as crystallized invert syrup and crystallized honey, comprising adding ethyl alcohol with the substance to the point where the ratio of alcohol to alcohol and water is of the order of 85% and the ratio of total solids to alcohol and water is of the order of 40%, thoroughly mixing them at a temperature of the order of 75 degrees F., causing the mixture to attain equilibrium, separating the liquid phase therefrom, and drying the solid residue remaining behind.

3. A method of recovering a maximum amount of levulose contained in crystallized invert syrup, which comprises mixing with crystallized invert syrup ethyl alcohol to the point where the ratio of alcohol to alcohol and water is of the order of 85% and the ratio of total solids to alcohol and water is of the order of 40% at a temperature of the order of 75 degrees F., causing the mixture to attain equilibrium, and separating the liquid phase from the solid phase.

ROBERT S. ANTHONY.